United States Patent
Holt et al.

(10) Patent No.: US 9,582,320 B2
(45) Date of Patent: Feb. 28, 2017

(54) COMPUTER SYSTEMS AND METHODS WITH RESOURCE TRANSFER HINT INSTRUCTION

(71) Applicants: James C. Holt, Austin, TX (US); Brian C. Kahne, Austin, TX (US); William C. Moyer, Dripping Springs, TX (US)

(72) Inventors: James C. Holt, Austin, TX (US); Brian C. Kahne, Austin, TX (US); William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 816 days.

(21) Appl. No.: 13/826,117

(22) Filed: Mar. 14, 2013

(65) Prior Publication Data

US 2014/0282561 A1    Sep. 18, 2014

(51) Int. Cl.
*G06F 9/48* (2006.01)
*G06F 9/46* (2006.01)

(52) U.S. Cl.
CPC ............ *G06F 9/4881* (2013.01); *G06F 9/462* (2013.01); *G06F 2209/486* (2013.01)

(58) Field of Classification Search
None
See application file for complete search history.

(56) References Cited

U.S. PATENT DOCUMENTS 6,148,326 A * 11/2000 Born .................... G06F 3/0617 718/100
6,801,943 B1    10/2004 Pavan et al.
8,140,825 B2 *  3/2012 Balakrishnan et al. ...... 711/221
8,205,200 B2     6/2012 Liao et al.
2005/0125802 A1 *  6/2005 Wang et al. .................. 718/108
2012/0131309 A1 *  5/2012 Johnson et al. ................ 712/41

OTHER PUBLICATIONS

Legobot, Context switch, Feb. 20, 2013, Wikipedia, pp. 1-4.*
Context Switch Definition, May 28, 2006, Linux Infomration Project, pp. 1-3.*
Context Switch, Apr. 18, 2012, WhatIs.com, p. 1.*

* cited by examiner

*Primary Examiner* — Emerson Puente
*Assistant Examiner* — Zhi Chen

(57) ABSTRACT

A processing system includes a processor configured to execute a plurality of instructions corresponding to a task, wherein the plurality of instructions comprises a resource transfer instruction to indicate a transfer of processing operations of the task from the processor to a different resource and a hint instruction which precedes the resource transfer instruction by a set of instructions within the plurality of instructions. A processor task scheduler is configured to schedule tasks to the processor, wherein, in response to execution of the hint instruction of the task, the processor task scheduler finalizes selection of a next task and loads a context of the selected next task into a background register file. The loading occurs concurrently with execution of the set of instructions between the hint instruction and resource transfer instruction, and, after loading is completed, the processor switches to the selected task in response to the resource transfer instruction.

18 Claims, 3 Drawing Sheets

COMPUTER SYSTEMS AND METHODS WITH RESOURCE TRANSFER HINT INSTRUCTION

BACKGROUND

Field

This disclosure relates generally to computer processing systems, and more specifically, to computer processing systems with resource transfer instructions.

Related Art

A computer processing system can include one or more processing cores and a hardware task scheduler. Programs to be run in the system are divided into a set of tasks and multiple tasks may share the processing cores as the tasks are performed. A new task is scheduled to run when a currently executing task issues a voluntary resource transfer instruction to the task scheduler. The task manager finalizes the next task to run, and the core switches to the next task by performing a context switch. Context switching is done in hardware through an alternate register file in the core, which can be read/written by the task scheduler hardware. In previously known systems, the task scheduler finalizes the next task to run in a core and loads the context after the task scheduler receives the resource transfer instruction. The core must wait to load the context information for the next task until the task scheduler indicates to the core which task is to run next.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein provide capability for a task to issue a hint that alerts a task scheduler in a computer processing system that the task is nearing a point where it will voluntarily yield or relinquish control of a core processor that is executing the task. When the task relinquishes control of the core, the core will be available to execute another task. When alerted to upcoming availability of a core, the task scheduler can determine the next task to be executed by the core and load context information for the next task while the current task continues executing to the point where the task is ready to relinquish control. The task scheduler stores the context information in a location that is readily accessible by the core and indicates to the core to switch context and begin executing the next task. The idle time of the core waiting for the task scheduler to determine the next task to execute and load the context information for the next task is eliminated. Providing the hint or alert therefore improves use of computer resources by reducing delay associated with context switching.

Figure 1:
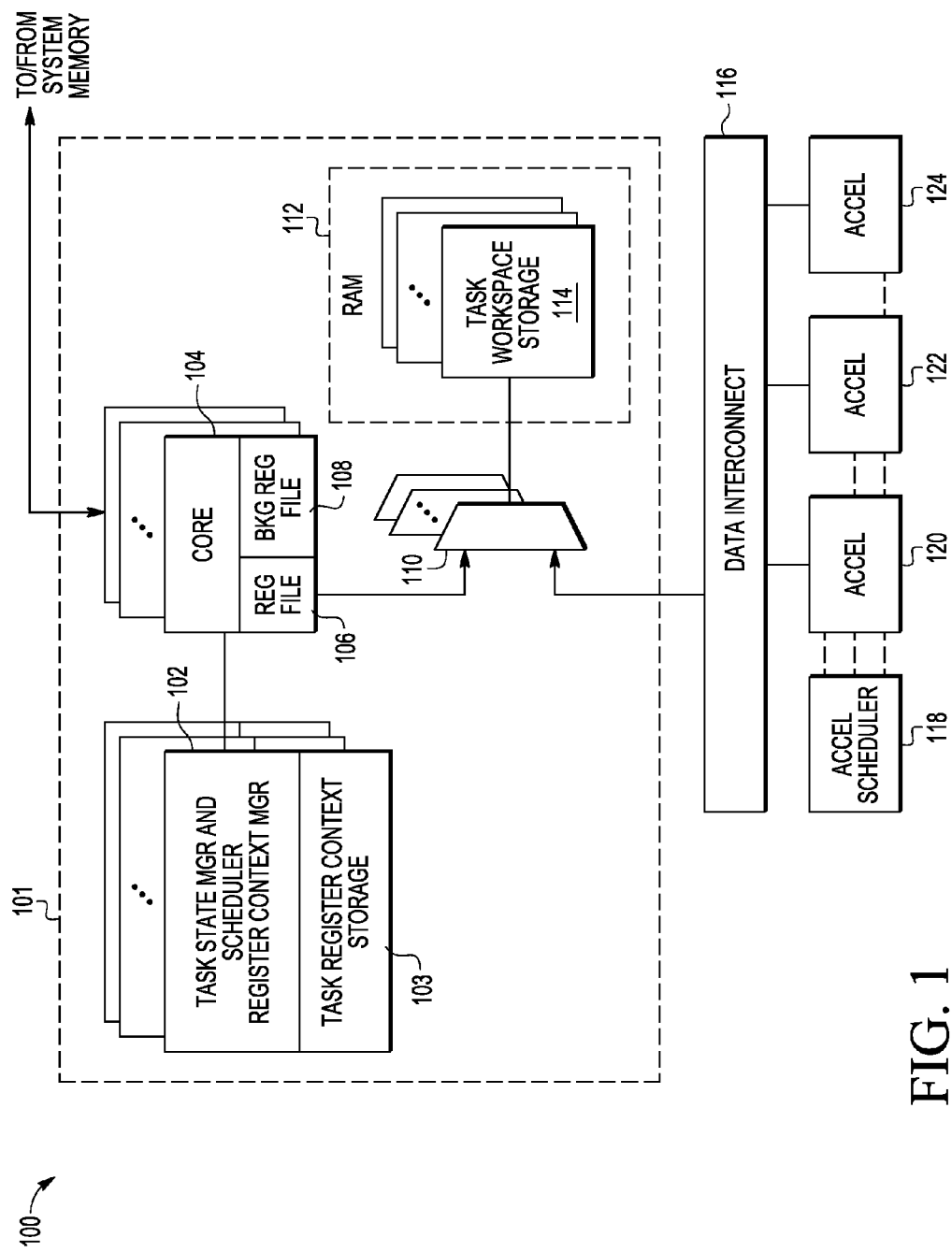
FIG. 1 is a block diagram of an embodiment of a computer processing system.

FIG. 1 is a block diagram of an embodiment of a computer processing system 100 including one or more core clusters 101. Core cluster 101 as shown includes a processor task scheduler 102 that manages task states, context registers, and schedules tasks for execution in one or more core processors 104. Each task scheduler 102 has associated task register context storage 103 for storing context information for each task. Core processors 104 have an associated register file 106 and background register file 108. A first input of one or more multiplexers 110 is coupled to core processors 104. An output of multiplexer 110 is coupled to random access memory (RAM) 112. RAM 112 has one or more task workspace storage areas 114 that can be used by cores 104 while the tasks are being executed. Core processors 104 are coupled to system memory (not shown) such as one or more levels of cache memory, read only memory, or other suitable type of memory.

Data interconnect 116 is coupled to a second input to multiplexer 110. Hardware accelerators 120, 122, 124 are coupled to data interconnect 116. Accelerators 120-124 can perform specialized computationally intensive portions of tasks such as graphics processing, complex instructions, and other suitable tasks or portions of tasks. Data interconnect 116 can be a data bus that enables hardware accelerators 120-124 to communicate with core cluster 101. Accelerator scheduler 118 schedules tasks or portions of tasks for execution by accelerators 120-124.

Tasks that are executed by core processors 104 can include one or more resource transfer instructions and corresponding hint instructions, among other types of instructions. The resource transfer instruction indicates a transfer of processing operations of the current task from a respective one of the core processors 104 to a different resource, thus freeing up the core processor 104 for use by another task. The hint instruction precedes a respective resource transfer instruction by a predetermined set of instructions or operations. The location of the hint instruction with respect to the resource transfer instruction may be determined by a compiler or may be inserted manually by a programmer. The hint instruction is typically executed far enough in advance of the resource transfer instruction to allow sufficient time for the task scheduler 102 to finalize the next task to execute and load the context information for the next task in background register file 108. Core processor 104 switches context information in background register 108 to active register file 106 and begins or continues executing the next task.

When the hint instruction is executed by a task, an alert or hint is sent to the task scheduler 102 indicating the current task is nearing a point where it will be ready to relinquish control of the core processor 104. While the task scheduler 102 finalizes or determines the next task to be executed by the core processor 104 and prepares the context information for the next task and loads it into background register 108 after receiving the hint or alert, the current task continues executing the instructions between the hint instruction and the corresponding resource transfer instruction.

Figure 2:
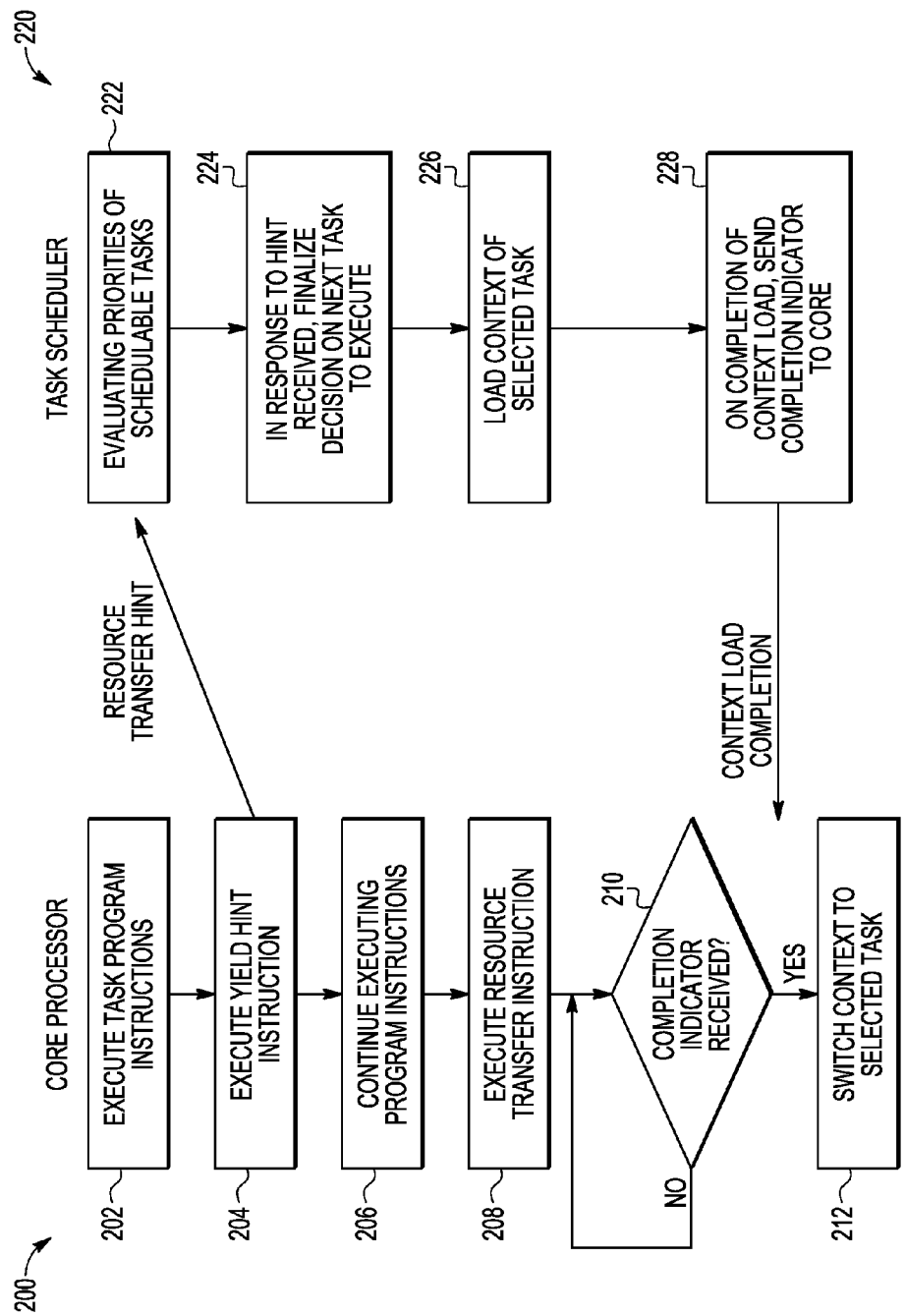
FIG. 2 illustrates flow diagrams of an embodiment of methods performed in a core processor concurrently with functions performed by a task scheduler.

Referring to FIGS. 1 and 2, FIG. 2 illustrates flow diagrams of embodiments of methods 200, 220 performed in a core processor 104 concurrently with functions performed by a task scheduler 102. Processes 202-212 are performed by core processor 104 while processes 222-118 are performed by task scheduler 102.

Process 202 includes a core processor 104 executing instructions of a current task. Instruction execution continues until process 204 determines that a hint instruction is being executed. When a hint instruction is executed, process 204 sends a hint indicator to process 222 in task scheduler 102. Process 206 in core processor 104 continues executing program instructions associated with the current task. Process 208 executes the resource transfer instruction to indicate that the task is ready to relinquish control of the core processor and proceeds to process 210 to wait until a context load completion indicator is received from the task scheduler 102. Once the context load completion indicator is received, process 212 switches context information and begins executing the task selected for execution by the task scheduler 102.

In task scheduler 102, process 222 evaluates priorities of tasks that are available for scheduling. Process 222 can also detect a hint indicating that a corresponding task being executed by one of the core processors will soon perform a resource transfer instruction. Once the hint indicator is received, process 224 evaluates one or more tasks available for scheduling and finalizes a decision on the next task to be executed. In some cases, a task that has higher priority or should execute next for other suitable reason can be selected as the next task, depending on priority or other criteria used in the selection process. For example, the most recently made initial selection of the next task before the hint indicator was received can be used. Process 226 loads the context information for the task selected in process 224 in background register 108. Once the context information for the selected task is loaded, process 228 sends the context load completion indicator to core processor 104. In another example, the next or selected task may be the task that sent the hint indicator based on priority. In such cases, the context information would not need to be loaded, but the completion indicator would still be set to indicate completion. Process 210 in core processor 104 can detect when the completion indicator is received.

Figure 3:
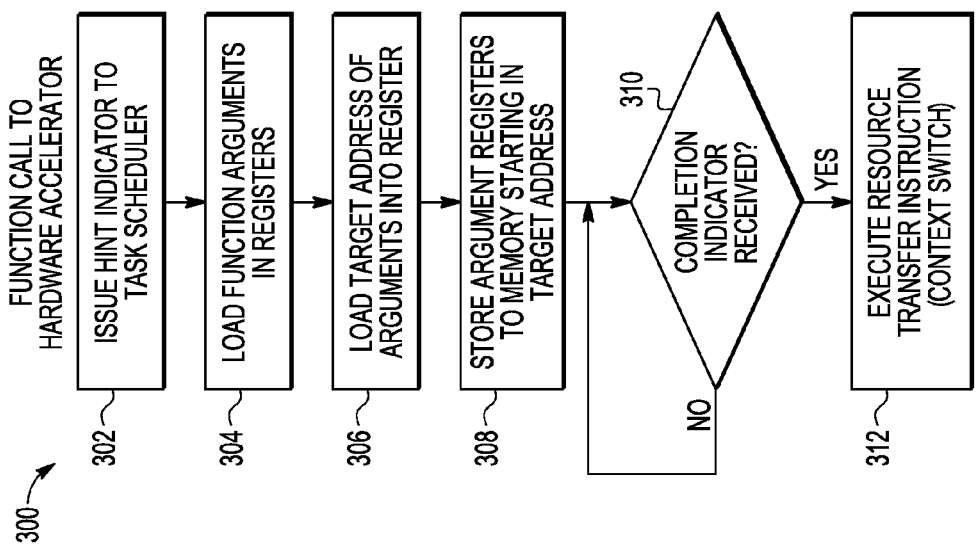
FIG. 3 illustrates a flow diagram of an embodiment of a method performed in a core processor before a context switch.

Referring to FIGS. 1 and 3, FIG. 3 illustrates a flow diagram of an embodiment of a method 300 performed by a task in core processor 104 before a context switch. In the example shown, the task issues a function call with two input arguments and one output argument to one of hardware accelerators 120-124, for example, hardware accelerator 120. Before the function call to the hardware accelerator 120 is executed, process 302 can indicate to the task scheduler 102 that the task will be relinquishing control of the core processor 104 by executing a hint instruction, which sends a hint indicator to task scheduler 102. Process 304 can then load function call arguments in registers (not shown) used by hardware accelerator 120. Process 306 can load the target address of the arguments into the registers. Process 308 can store the parameters in the argument registers starting at the target address. Process 310 waits until a context load completion indicator is received by the task. Process 312 executes the resource transfer instruction to relinquish control of core processor 104 while the function call is performed by hardware accelerator 120. If the completion indicator has been received by processor 104 by the time the context load is complete, the switch occurs, otherwise processor 104 stalls until the completion indicator is received and then the switch proceeds. When the return value is received from hardware accelerator 120 is ready, the associated task can be scheduled for execution by task scheduler 102.

Although a resource transfer to a hardware accelerator is provided as an example, a method similar to method 300 can be performed to resource transfers to other computing resources, as well as for other instructions that would cause core processor 104 to become idle while waiting for the instructions to finish execution.

Figure 4:
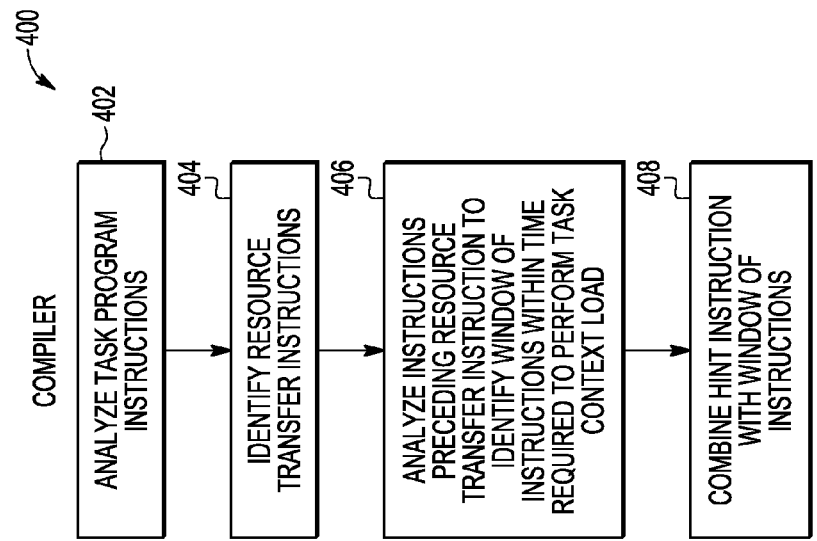
FIG. 4 illustrates a flow diagram of an embodiment of a method performed by a compiler to insert a hint instruction in a set of task program instructions.

FIG. 4 illustrates a flow diagram of an embodiment of a method 400 performed by a compiler to insert a hint instruction in a set of task program instructions. The compilation process translates higher level program instructions to machine level instructions and is performed before a program is executed. Process 402 analyzes the program instructions for the task and generates translations to and optimizations for the machine level code. Process 404 identifies resource transfer instructions in the task program instructions.

Process 406 analyzes instructions preceding each resource transfer instruction to identify a set or window of instructions that can be executed within the time required for task scheduler 102 to select the next task to execute (e.g., process 224 in FIG. 2), load context information for the selected task (e.g., process 226 of FIG. 2), and send a context load completion indicator to core processor 104 (e.g., process 228 of FIG. 2).

Process 408 can include combining the hint instruction with the set of instructions identified in process 406. The hint instruction can be placed at the beginning of the set of instructions or another suitable location. Note that instructions can be stored in blocks, which are loaded into RAM 112 at execution time. In some cases, the set of instructions identified in process 406 can span more than one block of instructions. In such cases, the compiler may not include the hint instruction with the set of instructions, or may locate a suitable place after a certain number of the instructions or at the beginning of the last block of the instructions in the set to insert the hint instruction.

By now it should be appreciated that in some embodiments, there has been provided a processing system that includes a processor (104) configured to execute a plurality of instructions corresponding to a task. The instructions includes a resource transfer instruction to indicate a transfer of processing operations of the task from the processor to a different resource and a hint instruction which precedes the resource transfer instruction by a set of instructions within the plurality of instructions. A processor task scheduler (102), coupled to the processor, is configured to schedule tasks to the processor. In response to execution of the hint instruction of the task (204), the processor task scheduler finalizes selection of a next task to utilize the processor (224) and loads a context of the selected next task into a background register file of the processor (226). The loading of the context of the selected next task occurs concurrently with execution of the set of instructions between the hint instruction and resource transfer instruction of the task (206). After loading of the context of the selected next task is completed, the processor switches to the selected task in response to the resource transfer instruction (210).

In another aspect of the processing system, the processor task scheduler is configured to provide a completion indicator to the processor when the loading of the selected next task is completed (228).

In another aspect of the processing system, the processor uses the background register file as a current register file when processing instructions of the selected next task.

In another aspect of the processing system, the processor, upon switching to the selected task, transfers information from the background register file to an active register file of the processor.

In another aspect of the processing system, the processor, in response to execution of the hint instruction, provides a hint indicator to the processor task scheduler (204), wherein the processor task scheduler finalizes the selection of the next task to utilize the processor in response to the hint indicator.

In another aspect of the processing system, the different resource is characterized as a hardware accelerator.

In another aspect of the processing system, a time required to execute the set of instructions is at least as long as a time required to load the context of the selected new task into the background register file.

In another aspect of the processing system, the processor task scheduler is configured to evaluate priorities of schedulable tasks (222), wherein the finalizing the selection of a next task to utilize the processor comprises selecting one of the schedulable tasks based on the priorities.

In another aspect of the processing system, the processor task scheduler is configured to evaluate priorities of schedulable tasks (222) and make initial selections of a next task during the evaluating, wherein the finalizing the selection of the next task comprises using the most recently made initial selection of the next task.

In other embodiments, a method can comprise executing, by a processor, instructions of a corresponding task (202). The instructions can comprise a resource transfer instruction to indicate a transfer of processing operations of the task from the processor to a different resource, and a hint instruction which precedes the resource transfer instruction by a set of instructions. In response to executing the hint instruction, a hint indicator is provided to a task scheduler (204). In response to the hint indicator, the task scheduler finalizes a selection of a next task to be scheduled (224). A context of the selected next task is loaded into a background register file of the processor (226). The loading of the context of the selected next task is performed by the task scheduler while with the processor executes the set of instructions between the hint instruction and the resource transfer instruction (206). After loading the context of the selected next task, the processor switches to the selected next task (210) in response to the resource transfer instruction.

In another aspect of the method, a completion indicator is provided by the task scheduler to the processor when the loading of the selected next task is completed (228). The switching by the processor to the selected task is performed in response to the resource transfer instruction and the completion indicator.

In another aspect of the method, the processor executes instructions of the selected next task. The processor uses the background register file as the current register file when executing the instructions of the selected next task.

In another aspect of the method, information from the background register file is transferred to an active register file of the processor. After transferring the information, the processor executes instructions of the selected next task. The processor uses the active register file when executing the instructions of the selected next task.

In another aspect of the method, the different resource is characterized as a hardware accelerator.

In another aspect of the method, a time required to execute the set of instructions is at least as long as a time required to load the context of the selected new task into the background register file.

In another aspect of the method, finalizing the selection of a next task to utilize the processor comprises selecting one of a plurality of schedulable tasks based on priorities of the schedulable tasks (222).

In another aspect of the method, the selection of a next task to utilize the processor is finalized using a most recently selected next task of a plurality of schedulable tasks which was selected prior to receiving the hint indicator (222).

In still other embodiments, a method of inserting a hint instruction into a plurality of instructions executable by a processor corresponding to a task includes identifying a resource transfer instruction within the plurality of instructions (404). Execution of the resource transfer instructions causes a transfer from a current resource to a new resource. A window of instructions (406) preceding the resource transfer instruction is identified whose predicted execution time is within an amount of time required to perform a load of task context information for a context switch. A hint instruction (408) is combined with the window of instructions. The hint instruction, upon execution by the processor, provides an indication that the resource transfer instruction will be executed subsequent to the hint instruction.

In another aspect of the method, instructions between the hint instruction and the resource transfer instruction is characterized as a basic block of instructions.

In another aspect of the method, combining the hint instruction with the window of instructions comprises inserting the hint instruction as a first instruction to be executed in the window of instructions.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Also for example, system 100 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process or task typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing system, comprising:
   a processor configured to execute a plurality of instructions corresponding to a task, wherein the plurality of instructions comprises a resource transfer instruction to indicate a transfer of processing operations of the task from the processor to a different resource and a hint instruction which precedes the resource transfer instruction by a set of instructions within the plurality of instructions; and
   a processor task scheduler, coupled to the processor, configured to schedule tasks to the processor, wherein, in response to execution of the hint instruction of the task, the processor task scheduler finalizes selection of a next task to utilize the processor and loads a context of the selected next task into a background register file of the processor, wherein:
      the loading of the context of the selected next task occurs concurrently with execution of the set of instructions between the hint instruction and resource transfer instruction of the task, and
      after the loading of the context of the selected next task is completed, the processor switches to the selected task in response to the resource transfer instruction; and
   wherein a time required to execute the set of instructions after execution of the hint instruction is predicted to be at least as long as a time required to load the context of the selected new task into the background register file.

2. The processing system of claim 1, wherein the processor task scheduler is configured to provide a completion indicator to the processor when the loading of the selected next task is completed.

3. The processing system of claim 1, wherein the processor uses the background register file as an active register file when processing instructions of the selected next task.

4. The processing system of claim 1, wherein the processor, upon switching to the selected task, transfers information from the background register file to an active register file of the processor.

5. The processing system of claim 1, wherein the processor, in response to execution of the hint instruction, provides a hint indicator to the processor task scheduler, wherein the processor task scheduler finalizes the selection of the next task to utilize the processor in response to the hint indicator.

6. The processing system of claim 1, wherein the different resource is characterized as a hardware accelerator.

7. The processing system of claim 1, wherein the processor task scheduler is configured to evaluate priorities of schedulable tasks, wherein the finalizing the selection of a next task to utilize the processor comprises selecting one of the schedulable tasks based on the priorities.

8. The processing system of claim 1, wherein the processor task scheduler is configured to evaluate priorities of schedulable tasks and make initial selections of a next task during the evaluating, wherein the finalizing the selection of the next task comprises using the most recently made initial selection of the next task.

9. A method comprising:
   executing, by a processor, instructions of a corresponding task, wherein the instructions comprise:
      a resource transfer instruction to indicate a transfer of processing operations of the task from the processor to a different resource; and
      a hint instruction which precedes the resource transfer instruction by a set of instructions;
   in response to executing the hint instruction, providing a hint indicator to a task scheduler;
   in response to the hint indicator, finalizing, by the task scheduler, a selection of a next task to be scheduled;
   loading a context of the selected next task into a background register file of the processor, wherein the loading of the context of the selected next task is performed by the task scheduler while the processor executes the set of instructions between the hint instruction and the resource transfer instruction; and
      after the loading the context of the selected next task, switching, by the processor, to the selected next task in response to the resource transfer instruction; and
   wherein a time required to execute the set of instructions after execution of the hint instruction is predicted to be at least as long as a time required to load the context of the selected new task into the background register file.

10. The method of claim 9, further comprising:
   providing, by the task scheduler, a completion indicator to the processor when the loading of the selected next task is completed, wherein the switching, by the processor, to the selected task is performed in response to the resource transfer instruction and the completion indicator.

11. The method of claim 9, further comprising:
   executing, by the processor, instructions of the selected next task, wherein the processor uses the background register file as an active register file when executing the instructions of the selected next task.

12. The method of claim 9, further comprising:
   transferring information from the background register file to an active register file of the processor; and
   after the transferring the information, executing, by the processor, instructions of the selected next task, wherein the processor uses the active register file when executing the instructions of the selected next task.

13. The method of claim 9, wherein the different resource is characterized as a hardware accelerator.

14. The method of claim 9, wherein the finalizing the selection of a next task to utilize the processor comprises selecting one of a plurality of schedulable tasks based on priorities of the schedulable tasks.

15. The method of claim 9, wherein finalizing the selection of a next task to utilize the processor comprises using a most recently selected next task of a plurality of schedulable tasks which was selected prior to receiving the hint indicator.

16. A method of inserting a hint instruction into a plurality of instructions executable by a processor corresponding to a task, comprising:
   identifying a resource transfer instruction within the plurality of instructions, wherein execution of the resource transfer instructions causes a transfer from a current resource to a new resource;
   identifying a window of instructions preceding the resource transfer instruction whose predicted execution time is within an amount of time required to perform a load of task context information for a context switch; and
   combining a hint instruction with the window of instructions, wherein the hint instruction, upon execution by the processor, provides an indication that the resource transfer instruction will be executed subsequent to the hint instruction.

17. The method of claim 16, wherein instructions between the hint instruction and the resource transfer instruction is characterized as a basic block of instructions.

18. The method of claim 16, wherein combining the hint instruction with the window of instructions comprises inserting the hint instruction as a first instruction to be executed in the window of instructions.

* * * * *